US012313558B2

(12) United States Patent
Ashmead et al.

(10) Patent No.: US 12,313,558 B2
(45) Date of Patent: May 27, 2025

(54) SUPERCONTINUUM LASER BASED WEB GAUGING SYSTEM

(71) Applicant: THERMO ELECTRON SCIENTIFIC INSTRUMENTS LLC, Madison, WI (US)

(72) Inventors: Damian Ashmead, Middletown, DE (US); John Magie Coffin, Blue Mounds, WI (US); Francis Deck, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 211 days.

(21) Appl. No.: 18/055,636

(22) Filed: Nov. 15, 2022

(65) Prior Publication Data

US 2023/0168204 A1  Jun. 1, 2023

Related U.S. Application Data

(60) Provisional application No. 63/264,758, filed on Dec. 1, 2021.

(51) Int. Cl.
*G01N 21/86* (2006.01)
*G01B 11/06* (2006.01)

(52) U.S. Cl.
CPC ......... *G01N 21/86* (2013.01); *G01B 11/0691* (2013.01); *G01N 2021/8636* (2013.01); *G01N 2021/8672* (2013.01); *G01N 2021/869* (2013.01)

(58) Field of Classification Search
CPC .......... G01N 21/86; G01N 2021/8636; G01N 2021/8672; G01N 2021/869; G01B 11/0691
See application file for complete search history.

(56) References Cited

U.S. PATENT DOCUMENTS

| | | | | | |
|---|---|---|---|---|---|
| 3,994,593 | A | * | 11/1976 | Kato | G01N 27/44721 356/69 |
| 4,778,995 | A | * | 10/1988 | Kulpinski | G01T 1/2014 250/368 |
| 5,850,287 | A | * | 12/1998 | Sorin | G01B 11/0691 356/479 |
| 6,038,027 | A | * | 3/2000 | Marcus | G01B 9/02069 356/503 |

(Continued)

FOREIGN PATENT DOCUMENTS

EP  2200758 B1  1/2014

OTHER PUBLICATIONS

PCT/US2022/079880, International Search Report and Written Opinion, Feb. 22, 2023, 9 pages.

(Continued)

*Primary Examiner* — Mohamed K Amara
(74) *Attorney, Agent, or Firm* — William R McCarthy, III (57) ABSTRACT

A web gauging system and methods of using the web gauging system are described. The web gauging system includes a supercontinuum Laser providing a light beam. A beam expander is configured to expand the light beam and provide an expanded beam to a sample illumination area. A detector unit configured to detect a sample light from the illumination area. A moving web can be placed in the illumination area, where the web gauging system measures parameters of the web.

17 Claims, 9 Drawing Sheets

(56) References Cited

U.S. PATENT DOCUMENTS

| | | | |
|---|---|---|---|
| 6,404,491 B1* | 6/2002 | Hougham | G01N 21/43 |
| | | | 356/429 |
| 6,775,447 B2 | 8/2004 | Nicholson et al. | |
| 7,116,874 B2 | 10/2006 | Brown et al. | |
| 7,130,512 B2 | 10/2006 | Kuksenkov et al. | |
| 8,085,397 B2 | 12/2011 | Haran et al. | |
| 8,527,212 B2 | 9/2013 | Hughes et al. | |
| 9,564,729 B2 | 2/2017 | Andrés Bou et al. | |
| 10,801,953 B2* | 10/2020 | Wang | G01N 21/9501 |
| 12,038,511 B2* | 7/2024 | Satyan | G02F 1/21 |
| 2004/0207836 A1* | 10/2004 | Chhibber | G01N 21/8806 |
| | | | 356/237.4 |
| 2004/0227952 A1* | 11/2004 | Jasapara | C03B 37/0253 |
| | | | 356/479 |
| 2005/0088647 A1* | 4/2005 | Shanmugasundram | |
| | | | C23C 18/1651 |
| | | | 356/326 |
| 2011/0007313 A1 | 1/2011 | Haran et al. | |
| 2012/0281427 A1* | 11/2012 | Shakespeare | G01J 3/501 |
| | | | 362/555 |
| 2017/0168206 A1* | 6/2017 | Kakinoki | G02B 5/3083 |
| 2018/0364160 A1* | 12/2018 | Aben | G01N 21/86 |
| 2018/0372650 A1* | 12/2018 | Pieralisi | G01N 21/896 |
| 2019/0171152 A1* | 6/2019 | Sakakibara | G03G 15/602 |
| 2020/0011651 A1* | 1/2020 | Xu | G01B 11/2441 |
| 2020/0217643 A1* | 7/2020 | Schnell | G01N 21/4788 |
| 2021/0131787 A1 | 5/2021 | Hänggli et al. | |
| 2021/0223526 A1* | 7/2021 | Knop | G01N 21/6458 |
| 2023/0236112 A1* | 7/2023 | Prater | G01N 21/6458 |
| | | | 356/451 |
| 2024/0133674 A1* | 4/2024 | Zhang | G02B 27/30 |

OTHER PUBLICATIONS

Gattinger P., et al., "Near-infrared hyperspectral single-pixel imaging system," Doctoral dissertation, Wien, 2019, 51 pages.

Gosselin R., et al., "Potential of Hyperspectral Imaging for Quality Control of Polymer Blend Films," Industrial & Engineering Chemistry Research, 2009, vol. 48, No. 6, pp. 3033-3042.

Granzow N., "Supercontinuum White Light Lasers: a Review on Technology and Applications," Proceedings of SPIE, Photonics and Education in Measurement Science, 2019, vol. 11144, 6 pages.

Kraft S., et al., "Fluorescence Imaging Spectrometer Concepts for the Earth Explorer Mission Candidate FLEX," International Conference on Space Optics (ICSO), Oct. 9-12, 2012, vol. 10564, 10 pages.

L3Harris Geospatial, "Push Broom and Whisk Broom Sensors," retrieved on Nov. 29, 2021, 3 pages, Retrieved from the Internet URL: https://www.l3harrisgeospatial.com/Support/Self-Help-Tools/Help-Articles/Help-Articles-Detail/ArtMID/10220/ArticleID/16262/Push-Broom-and-Whisk-Broom-Sensors.

Lange F., et al., "The Use of Supercontinuum Laser Sources in Biomedical Diffuse Optics: Unlocking the Power of Multispectral Imaging," Applied Sciences, 2021, vol. 11, No. 4616, 32 pages.

Smith C.R., et al., "Low-Noise Tunable Deep-Ultraviolet Supercontinuum Laser," Scientific Reports, 2020, vol. 10, No. 18447, 11 pages.

Yang S., et al., "Mid-Infrared Compressive Hyperspectral Imaging," Remote Sensing, 2021, vol. 13, No. 741, 18 pages.

\* cited by examiner (Prior Art)
FIG. 1

SUPERCONTINUUM LASER BASED WEB GAUGING SYSTEM

CROSS-REFERENCE TO RELATED APPLICATIONS

This application claims priority to U.S. application No. 63/264,758 filed Dec. 1, 2022, which disclosure is herein incorporated by reference in its entirety.

FIELD OF THE INVENTION

This invention is directed to a supercontinuum Laser based web gauging system. For example, the system can be used to measure properties of a web in a continuous web making process.

BACKGROUND OF THE INVENTION

Web gauging systems are measurement and control systems used for materials manufactured in a continuous web process. They are typically non-contact scanners utilizing beta, x-ray, or infrared spectroscopy to measure the basis weight, composition, or thickness of flat sheets of plastic, rubber, packaging, building materials, or textiles. Typical continuous web manufacturing processes produce webs that range from 1 to 10 meters wide and move on conveyor systems at linear speeds of up to 600 meters per minute.

Figure 1:
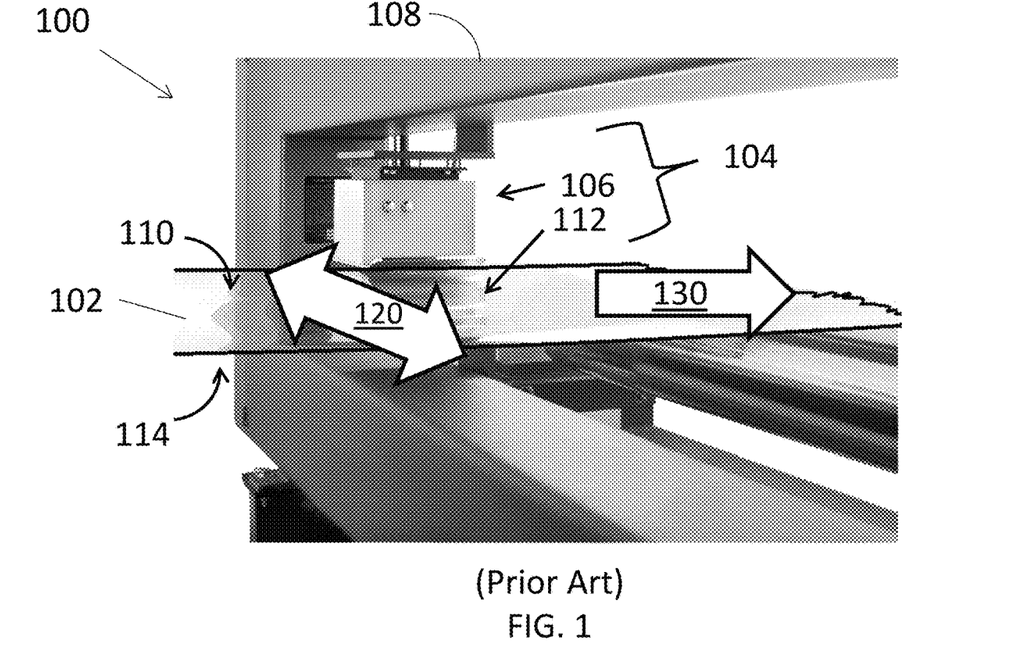
FIG. 1 is a 3D partial view of a web gauging system.

Web gauging systems help manufactures reduce costs and improve quality by providing real time, closed loop feedback on-line during the "Web Processing" or "Roll-to-Roll Processing" technologies. FIG. 1 shows a typical web gauging system 100. The web gauging system 100 utilizes infrared absorption or transmission spectroscopy to actively monitor the thickness of a moving web 102 as it passes through the sensor 104. The web 102 is fed through the web gauging system 100 typically using rollers that keep the web at the correct tension and position in the web gauging system 100. The web gauging system 100 consists of a light source, typically a broad spectrum infrared source such as a tungsten coil, which can be mounted on a first head 106, an infrared array detector integrated with a linear variable filter capable of detecting infrared radiation from about 1.4 to 3.7 microns in wavelength, collimating optics, and a frame 108 that acts as gantry to hold the sensor 104 in position relative to the web and scan the sensor 104 across the web 102 as the web 102 is moving relative to the sensor 104. The first head 106 is mounted facing a first side 110 of the web 102, and a second head 112 can be mounted facing a second, opposite side 114 of the web 102. For example, in a transmission mode, the first head 106 can provide IR light to the first side 110 of the web 102, and the second head 112 can input/direct IR light transmitted through the web 102 to a detector. In a reflection mode, the IR light is provided to the same side where reflected IR light is input/directed to a detector, i.e., first side 110 provides IR light, and reflected IR light is detected from the first side 110. The resulting infrared transmission or reflection spectrum provides real time feedback about the thickness and composition of the web to the manufacturer.

While existing web gauging systems such as 100 are very robust and useful systems, they are unable to achieve 100% web inspection. A typical sensor 104 has a spot size of roughly 10 mm×35 mm or 350 mm$^2$ and a measurement time of 18 milliseconds. As described above, the sensor 104 is held on the gantry 108 that translates the sensor 104 back and forth across the moving web 102 in a cross-web direction or sensor direction 120. At the same time, the web 102 is moving perpendicular to the sensor direction 120 at speeds of up to 600 meters/min in what is referred to herein as a web direction 130. Inherently, the sensor 104 is only capable of measuring a few % of the total area of the moving web 102, and in many cases less than 1% of the total area is measured. This leaves most of the area of the web not actively monitored and forces manufacturers to make process control adjustments that affect the entire web based on a small sample size.

One solution to increase the area of measured web is to simply measure and scan faster. There are two factors however that contribute to scan time that make it difficult to do so. The first is the rate at which the gantry can translate the sensor 104 in the cross-web direction 120. As scan speeds increase, it can introduce vibrations and oscillations that affect the accuracy and reproducibility of the optical measurement. In addition, the sensor weight is not insignificant and turn-around time must be taken into consideration when changing the scan direction. The gantry 108 can be made more robust, but this comes with added cost and one quickly reaches the point of diminishing returns. The second factor limiting the scan speed is the data acquisition rate of the sensor itself. Acquisition rates are driven by the sensitivity and response time of the detector, the optical power emitted by the light source, and the ability of the system to focus the optical energy onto the detector. Without changing the detector or source, increasing the data acquisition rate of the existing systems will result in reduced signal to noise, which in turn affects the accuracy and reproducibility of the optical measurement.

A corollary to the above flawed solution is to slow the web translation speed in the web direction 130. This is usually not an optimal solution as it would introduce a time bottleneck in established web-making processes. Additionally, in some optimized web-making processes, such a blown film extrusion process, the web/film may be cooling while being translated and the process cannot be slowed down without changing the film properties.

Another solution to increase the area of the measured web would be to add additional sensors 104 to the gantry 108 or using more gantries, enabling increased coverage of the moving web 102. While viable, these options increase the cost of the system with each additional sensor head and gantry installed.

Accordingly, there remains a need for improved web gauging systems. Systems that can scan a larger portion/area of a moving web while maintaining a high throughput are highly desirable.

SUMMARY

Systems, methods, and products to address these and other needs are described herein with respect to illustrative, non-limiting, implementations. Various alternatives, modifications and equivalents are possible.

In accordance with a first aspect, a web gauging system includes a supercontinuum (SC) Laser providing a light beam; a beam expander configured to expand the light beam and provide an expanded beam to a sample illumination area; and a detector unit configured to detect a sample light from the illumination area.

In accordance with a second aspect, a method of measuring a web parameter includes positioning a web in a sample illumination area of the web gauging system according to the first aspect; illuminating a first portion of the web with the light beam and producing a first sample light; detecting the first sample light with the detector unit, wherein the first sample light is indicative of a web parameter of the first portion of the web. Optionally, the method includes moving the web to illuminate a second portion of the web and detecting a second sample light with the detector unit, wherein the second sample light is indicative of the web parameter of the second portion of the web.

The web gauging systems described herein can scan a large portion/area of a moving web while maintaining a high throughput.

BRIEF DESCRIPTION OF THE DRAWINGS

The foregoing and other features and advantages of the present embodiments will be more fully understood from the following detailed description of illustrative embodiments taken in conjunction with the accompanying drawings.

The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

As used herein "supercontinuum" or "SC" Laser light refers to light that has high spatial coherence and low temporal coherence. This means that the light has the same phase across the beam, and different phases after long propagation times. As used herein "across" the beam is a direction perpendicular to the direction of the light propagation. Similarly, a "cross-wise" area of the beam is an area of illumination perpendicular to the beam. Monochromatic Laser light differs from SC Laser light in that monochromatic Laser light has high spatial and high temporal coherence. That is, monochromatic Laser light has the same phase across the beam and maintains the same phase after long propagation times. Both SC Laser beams and monochromatic Laser beams have "low divergence," meaning they can be effectively directed (collimated) for relatively long distances as a collimated beam (e.g., more than 1 meter). This contrasts with light from a filament or globar source, which produces light having low spatial and temporal coherence and where the light, even if collimated will spread out at relatively short distances (e.g., less than 1 mm).

Although monochromatic Lasers can provide a highly collimated beam that can be focused to a spot or area of high brightness, they only provide a very narrow spectral band of light. This narrow spectral band is of limited use for effectively exciting diverse energy transitions, such as IR stretching bands for different chemical species. Traditional filament or globar light sources are "broadband" sources, meaning they can provide a wide diversity of excitation energies/frequencies, but are not amenable to production of bright illumination over a large area. SC Lasers combine some of the properties of conventional broadband light sources with the properties of monochromatic Lasers, including having a broad spectral output while being amenable to collimation and focusing to a large area with a high brightness.

By using the unique optical characteristics of SC Lasers, a new web gauging system as described herein overcomes the drawbacks of traditional web gauging systems such as 100 (FIG. 1). With its low divergence, a SC Laser source can be fixed and no longer needs to be scanned along with the sensor over the web. In addition, due to the high brightness of the SC Laser, the light can be multiplexed across the web, illuminating up to 100% of the width of the web in the cross-web direction 120. In some implementations infrared light is used in the systems described herein. For example, Mid-IR light having wavelengths between about 1 μm and 5

µm can be used. These wavelengths include energies that are absorbed by a large amount of chemical species of interest such as C—H, O—H, and N—H stretching which is relevant to analysis of organic resins and films, graphene oxide, metal oxides, and silica. Advantageously, mid-IR supercontinuum lasers, which emit high brightness, low noise, mid-infrared light and which were previously only found in research laboratories, are becoming increasingly available for industrial applications. One such example is the ThorLabs SC4500 which emits SC Laser light in the range of 1.3 to 4.5 microns.

Figure 2:
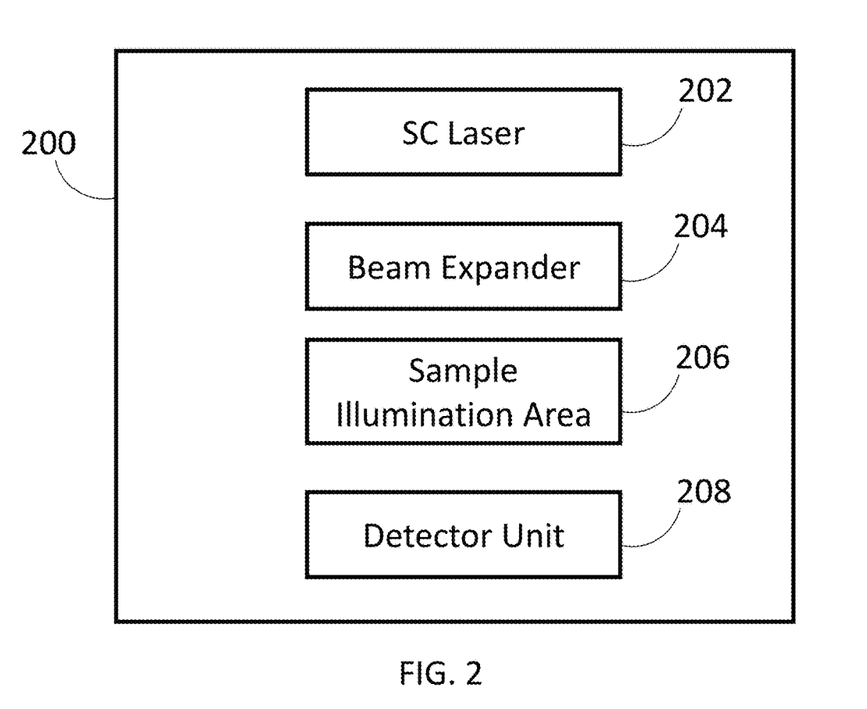
FIG. 2 is a block diagram showing features of a web gauging system, according to some implementations.

FIG. 2 is a block diagram showing components of a web gauging system 200, according to some implementations. The web gauging system 200 includes a SC Laser 202, a beam expander 204, a sample illumination area 206 and a detector unit 208. The SC Laser 202 provides a light beam that is expanded by the beam expander 204. The expanded beam is then provided to the sample illumination area 206, where the light from the expanded beam can interact with a sample (e.g., a web). Light from the sample illumination area 206, such as light that passes through the sample illumination area 206, or light that is reflected from the sample illumination area 206, is referred to herein as a sample light. The sample light from the sample illumination area 206 can be detected by the detector 208.

As used herein "expanded" refers to an increase in the cross-wise area of the light beam after the beam is directed to/through the beam expander 204. In some implementations, the beam expander 204 expands the beam substantially evenly: that is there is a one to one correspondence in the light flux in the cross-wise area before the beam is expanded and in the light flux in the cross-wise area after the beam is expanded. Otherwise described, the beam expander 204 increase the diameter of a collimated input beam to a larger collimated output beam.

The beam expander 204 can be a transmissive element or a reflective element. For example, transmissive lenses can be appropriate for visible light expansion, e.g., silica-based glasses, transparent salts, or plastics such as polycarbonate. In some implementations, the lenses can be appropriate for infrared light, such as ZnSe or KBr transmissive lenses. In some implementations, the beam expander is a reflective element, which can be used for visible or infrared light. Without limitation, and by way of example, the beam expander can include a curved mirror or a cylindrical mirror. In some implementations, the beam expander 204 expands the beam by sweeping an input beam over a sweeping angle. For example, a rotating or pivoting lens or mirror that sequentially fans out the input beam. These implementations are described in more detail in the forgoing with reference to FIGS. 5A-8, and after a detailed description of detectors.

Figure 3:
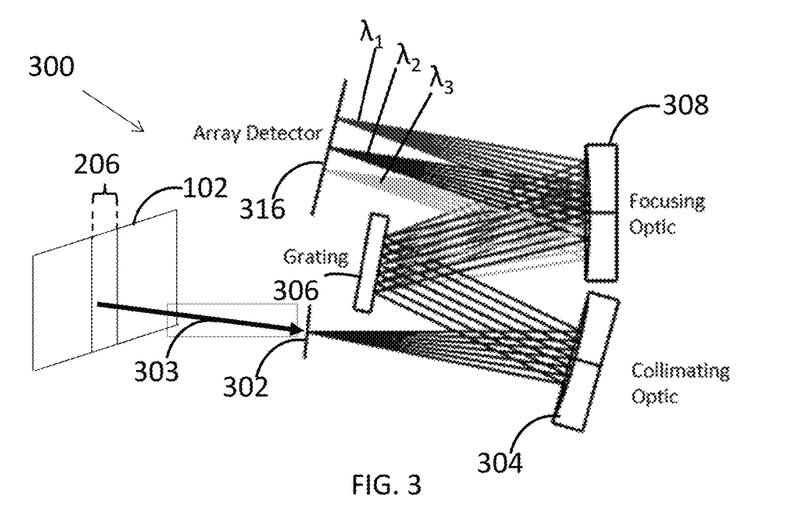
FIG. 3 shows a detector unit used in the web gauging system of FIG. 2, according to some implementations.

The detector unit 208 can be any detector unit that inputs and detects the sample light. FIG. 3 illustrate an implementation of the detector unit 208 which is configured to include a spectrophotometer 300. The spectrophotometer 300 includes an entrance slit 302, which inputs the sample light 303 from the sample illumination area 206 of the web 102. The entrance slit 302 controls the spectral resolution of the optical system. The spectrophotometer 300 also includes a collimating optic 304, a dispersive flat grating 306, and a focusing optic 308 that focuses the dispersed light of different wavelengths (e.g., $\lambda_1$, $\lambda_2$, $\lambda_3$) onto the detector 316.

In some implementations the spectrophotometer 300 is a small (e.g. about 5 cm$^3$), Czerny Turner design, optimized for the mid-IR region of 1-5 µm. In such implementations, the detector 316 can be any infrared array detector with sensitivity over the wavelength range of 1 to 5 microns such as a PbS or PbSe array, a Mercury-Cadmium-Telluride (MCT) array, an InAsSb array, or a Lead-Zirconate-Titanate (PZT) based array.

Figure 4:
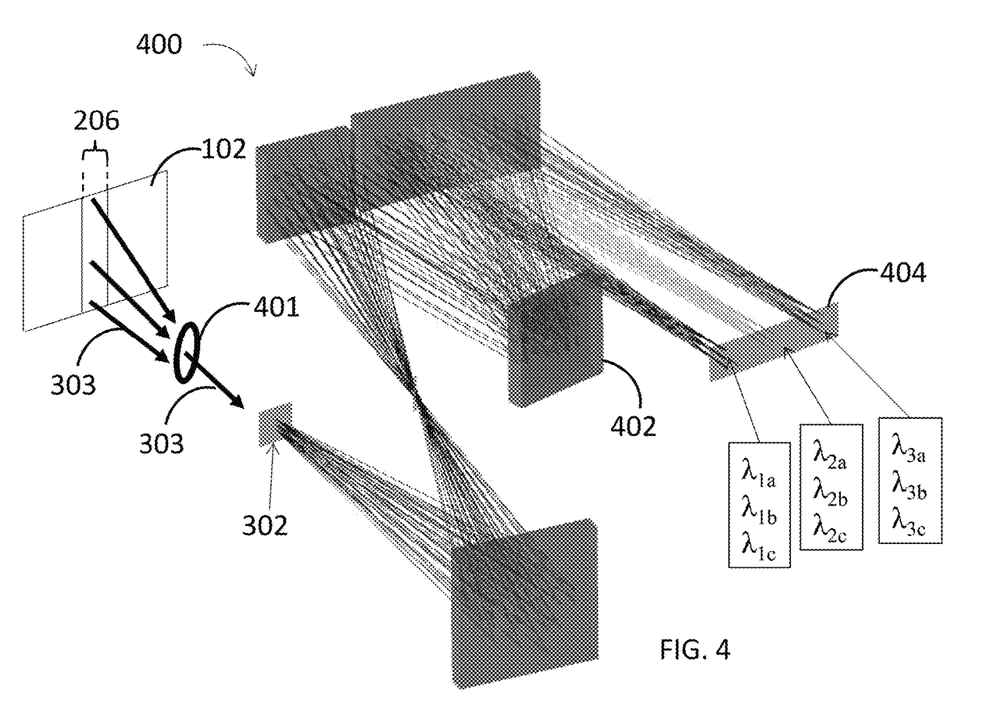
FIG. 4 shows a hyperspectral imaging system used in the web gauging system of FIG. 2, according to some implementations.

In some other implementations, the detector unit 208 is configured as a hyperspectral imaging system 400, illustrated by FIG. 4. The hyperspectral imaging system 400 can be used to monitor about 100% of the web 102 (FIG. 1) as it moves in the web direction 130 while being illuminated by the SC laser 202 (FIG. 2). In this implementation, the beam expander 204, is used to disperse light from the SC Laser 202 across the width of the web 102. On the other side of the web 102, an image capture optic 401 with a large enough field of view to simultaneously capture all of the sample light 303, across the entire width of the web 102, directs the sample light 303 to the entrance slit 302. The image capture optics can include collimating, relay and focusing optics. Within the hyperspectral imaging system 400, a dispersive element (grating) 402 and an array detector 404 enable the capture of both spatial and spectral information of the web simultaneously across the entire frame of view (FOV) of the hyperspectral imaging system 400. For example, the figure shows a single image captures three different areas and three different frequencies for each area ($\lambda_{1a}$, $\lambda_{1b}$, $\lambda_{1c}$, $\lambda_{2a}$, $\lambda_{2b}$, $\lambda_{2c}$, $\lambda_{3a}$, $\lambda_{3b}$, $\lambda_{3c}$). In this configuration, spatial resolution is defined by height of the entrance slit 302 and the pixel size/pitch of the array detector 404. Generally, an MCT, InSb, or InAsSb focal plane array of more than 1000×1000 pixels is used to achieve the desired spatial and spectral range.

The hyperspectral imaging system can be implemented in a push broom configuration or in a whisk broom configuration, and can be as described in the art. For example, as described in: "Mid-Infrared Compressive Hyperspectral Imaging," S. Yang et al., *Remote Sens.* 2021, 13, 741, available atwww.mdpi.com/2072-4292/13/4/741 accessed Oct. 8, 2021; "Near-infrared hyperspectral single-pixel imaging system," P. Gattinger, Thesis, Technische Universitat Wien, available at www.repositum.tuwien.at/handle/20.500.12708/6517 accessed Oct. 8, 2021; S. Kraft et al., *Fluorescence imaging spectrometer concepts for the Earth*, available at www.researchgate.net/publication/25924097 Fluorescence Imaging Spectrometer concepts for_the_Earth_Explorer_Mission_Candidate_FLEX, accessed Nov. 29, 2021; and Ryan Gosselin et al. "*Potential of Hyperspectral Imaging for Quality Control of Polymer Blend Films*, Ind. Eng. Chem. Res. 2009, 48, 3033-3042.

Figure 5A:
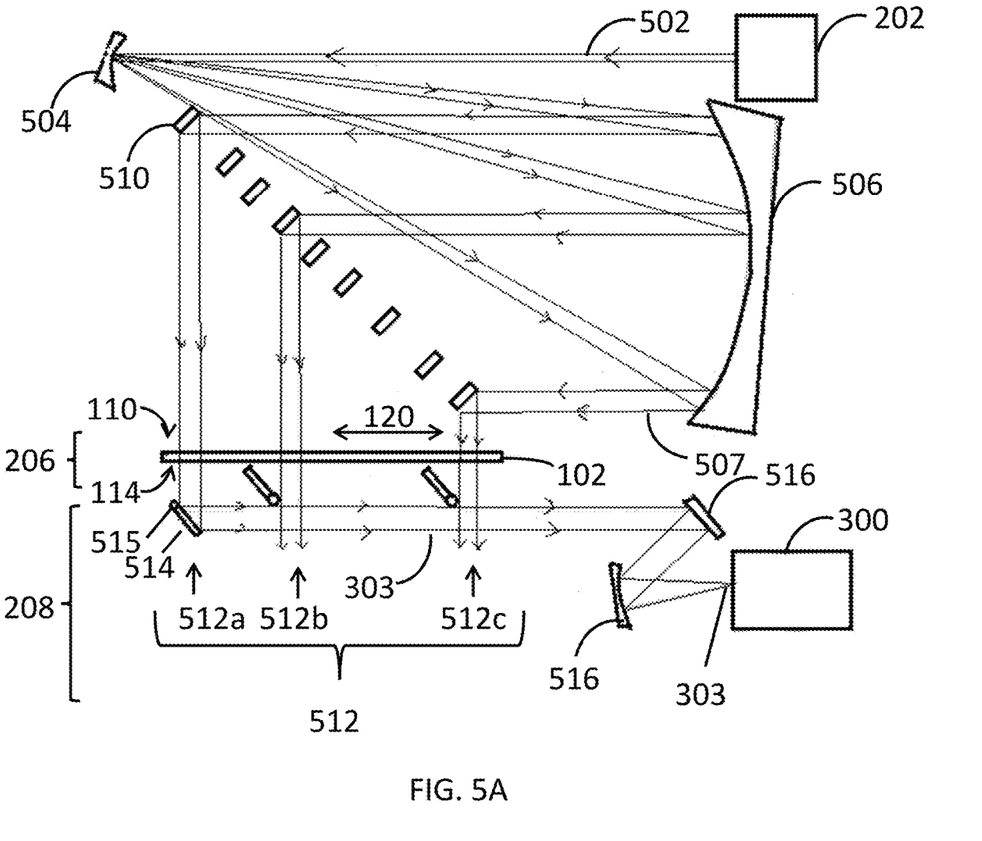
FIG. 5A shows a first implementation of the web gauging system of FIG. 2.

FIG. 5A illustrates an implementation, of the web gauging system 200 (FIG. 2). The SC Laser 202 provides a collimated SC Laser beam 502. The collimated SC Laser beam 502 is directed to the beam expander 204 (FIG. 2), which is configured as a combination of two mirrors; a cylindrical mirror 504 of relatively short focal length (beam expanding), and a concave mirror 506 of relatively long focal length (beam collimating). This combination of mirrors 504 and 506, with short and long focal lengths respectively, expands and collimates the collimated SC laser beam 502 to an expanded beam 507, approximately having the width of the web 102 in the cross-web direction 120. A series of pre-sample mirrors 510 are then used to multiplex the expanded beam 507 into discrete channels 512, one channel per pre-sample mirror 510, which is directed to the sample illumination area 206. The path of light through three channels 512*a*, 512*b* and 512*c* is indicated. For legibility, not all channels are shown.

The web 102 is positioned in the sample illumination area 206. In FIG. 5A, the web direction 130 (FIG. 1) is perpendicular to the page and the cross-web direction 120 is horizontal to the page, as indicated by the double headed arrow. Light from the pre-sample mirrors 510, which is partitioned from expanded beam 507 into the channels 512, is directed simultaneously to the first side 110 of the web 102 across the web 102. In this implementation, the detector unit 208 includes the flipper mirrors 514, re-focusing optics 516, and the spectrophotometer 300. The flipper mirrors 514 are positioned facing the second side 114 of the web 102 and include a hinge 515 on one side. By rotation about the hinge 515, the flipper mirrors 514 are used to direct the light from each of the channels 512, one at a time, to the re-focusing optics 516. For example, the flipper mirror 514 at the channel 512a can be positioned in an orientation as shown ("on" or "active") directing sample light 303 towards the re-focusing optics 516, while the mirrors at the channels 512b and 512c are rotated out of the path of sample 303 ("off" or "inactive"). This arrangement passes sample light 303 from each channel 512 sequentially into the spectrophotometer 300 where an optical measurement is made. As used herein "sequentially" denotes a specific order that can be repeated to cycle through all or a portion of the expanded beam 507 that produces sample light 303. Any order can be used in the sequence to send sample light 303 from the channels 512 to the re-focusing optics 516. In some implementation, a subset of the channels 512 are used, for example where only a portion of the web 102 is analyzed, or the coverage of the web by the channels 512 is larger than the web 102 in the cross-web 120 direction. This can be used to advantageously select only areas of interest for analysis where monitoring may be more important (e.g., outer edges of web 102 or the center areas of the web 102), or to minimize data processing.

In some implementations, the flipper mirrors 514 are mirrors mounted to a stepper motor, where the axel is perpendicular to the page and is located at hinge 515. In some other implementations, the flipper mirrors are a MEMS device such as a digital micromirror device (DMD). In such devices, each mirror can be individually rotated to the on (active) or off (inactive) state.

As noted earlier, the web 102 cross-web diameters can be between about 1 and 10 meters. A person of skill in the art understands how to select ratios of the focal lengths for mirrors 504 and 506 to illuminate a desired cross-wise width of the web 102. The number and dimensions of the pre-sample mirrors 510 and the flipper mirrors 514 can also be selected by choice of the person of skill in the art depending on how many channels are desired and the cross-wise width of the web 102. In some implementations, there is a one to one correspondence between the pre-sample mirrors 510 and the flipper mirrors 514. In some other implementations, there is not a one to one correspondence, for example, where two or more pre-sample mirrors 510 reflect light to fewer flipper mirrors 514, or one pre-sample mirror 510 reflects light to two or more flipper mirrors 514.

In some implementations, one or more of the pre-sample mirrors 510 are flat mirrors. In some other implementations, one or more of the pre-sample mirrors 510 are concave mirrors which focus the expanded beam 507 into a spot size illuminating the web 102 that is smaller than the pre-sample mirror 510 width. In yet other implementations, one or more of the mirrors 510 can be convex mirrors to expand the light to a larger spot size.

Figure 5B:
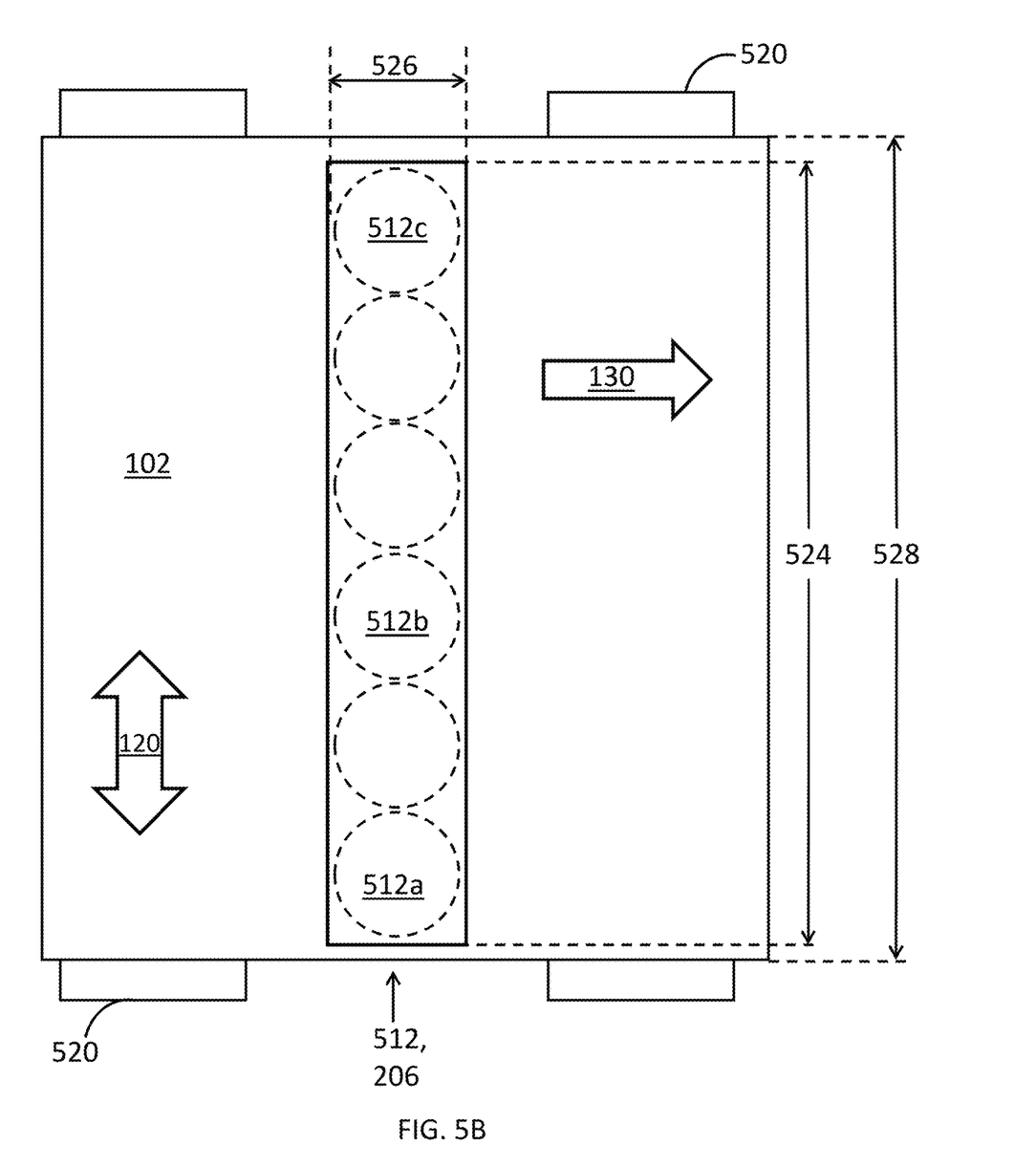
FIG. 5B shows a top view of the web gauging system of FIG. 5A.

FIG. 5B shows a top view of the web 102 positioned in the web gauging system 200 of FIG. 5A. The web 102 is held in place and conveyed in the web direction 130 through the sample illumination area 206 by rollers 520. In some implementations, multiple rollers can be used, for example to press or pinch the web 102 and hold the web 102 in the sample illumination area 206.

The sample illumination area 206 has a substantially rectangular boundary having a long dimension 524 approximately parallel to the cross-web direction 120, and a short dimension 526 approximately parallel to the web direction 130. The rectangular boundary 524, 526 defines a maximum of the sample illumination area 206, or the maximum area of web 102 illuminated by the expanded beam 507 (FIG. 5A). The shape of the pre-sample mirrors 510 will change the sample illumination area 206 shape. For example, if the pre-sample mirrors 510 are circular, these will provide an array of circular illumination spots, illustrated as dashed circles corresponding to the channels 512 such as 512a, 512b and 512c. This array of channels 512 define the sample illumination area 206, which is bounded by the rectangular boundary 524,526. A person of skill in the art recognizes that boundary shapes other than the rectangular boundary 524, 526 can be implemented and is determined by the arrangement of the optics such as the pre-sample mirrors 510.

In some implementations, the short dimension 526 is between about 1 mm and 10 cm. In some implementations, the long dimension 524 is at least about 10% of a width 528 of the web 102 in the cross-web direction 120, and the sample illumination area 206 illuminates at least about 10% of the moving web 102 as the web 102 moves through the rectangular boundary 524,526. In some implementations, the long dimension 524 is not more than about 110% of the width 528. In some implementations, the sample illumination area 206 illuminates between about 90% and 110% of the moving web 102 as the web 102 moves through the rectangular boundary 524,526. As previously described, in some implementations only some of the channels 512 are used, for example only the channels 512a and 512c are used to analyze the outer edges of web 102, where the sample illumination area 206 is discontinuous. As an alternative example, only channel the 512b is used to analyze a center area of the web 102.

The amount of the web 102 that can be analyzed is not more than what is illuminated in the rectangular boundary 524,526 as the web 102 moves through the sample illumination area 206. In addition, time to collect data is limited by the frame rate, which in turn depends on the Detectivity (D*). For example, some D* values for detectors are listed in Table 1.

TABLE 1

Detectivity for IR Detectors.

| Detector Type | Detectivity D* |
| --- | --- |
| PZT | $3.5 \times 10^8$ cm $\sqrt{Hz}$/W |
| MCT | $1.0 \times 10^{10}$ cm $\sqrt{Hz}$/W |
| Indium Antimonide (InSb) | $5.0 \times 10^{10}$ cm $\sqrt{Hz}$/W |
| Lead Sulfide (PbS) | $1.0 \times 10^{11}$ cm $\sqrt{Hz}$/W |

For example, in an implementation with three channels 512 and a PZT detector having a frame rate of 250 Hz (4 ms) to obtain 50 co-additions of the collected spectra it take 200 ms to collect the desired amount of spectral data. Using less co-additions will shorten the time at the expense of a good signal to noise ratio. Choosing a PbS detector increases the speed for collecting the same amount of spectral data by a factor of about 285 to less than 1 ms.

For the current systems depicted in FIG. 1, the scan rate is 25 ms with 50 co-additions when using a PbS detector. The current systems cover about 1% of the moving web. The increase in implementing the gauging system 200 as depicted in FIG. 5A,5B translates to an increase in the coverage to at least 25%. Accordingly, in some implementations, more than 1% of the moving web 102 provides sample light 303 (FIG. 2) that is analyzed by the detector unit 208 (e.g., more than 5%, more than about 10%, more than about 25%).

Another factor to consider is that the amount of the web 102 that can be analyzed is limited by the speed at which the flipper mirrors 514 can move from the active state, shown in channel the 512a, to the inactive state shown in the channels 512b and 512c (FIG. 5A). In some implementations, the rate of switching between active/inactive states for each of the channels 512 is selected between about 1 ms (1000 Hz) and about 100 ms (10 Hz).

Figure 5C:
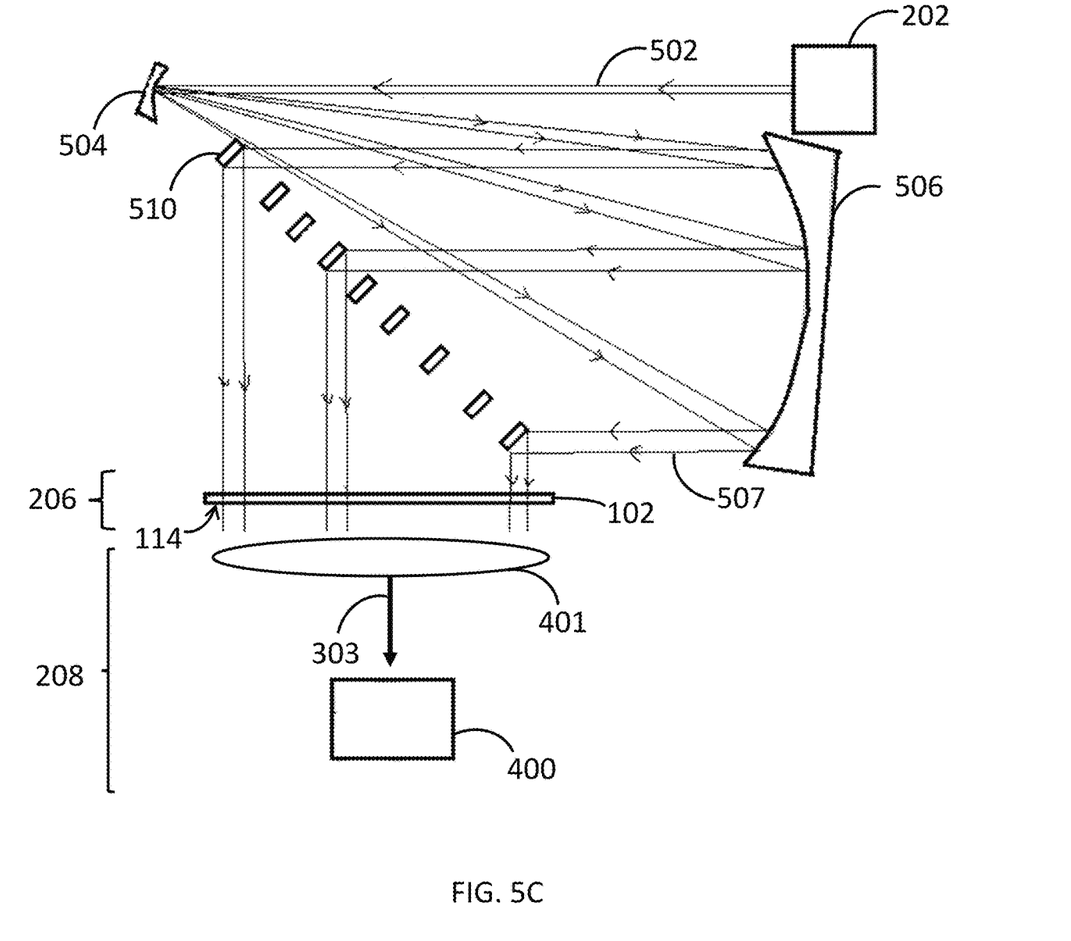
FIG. 5C shows an implementation of the web gauging system using the hyperspectral imaging system shown by FIG. 4.

FIG. 5C illustrates an implementation of the web gauging system 200 using the hyperspectral imaging system 400. In this implementation, similar elements as described for FIG. 5A are used for illuminating the web. Specifically, the SC Laser 202 provides the SC Laser beam 502 which is expanded by cylindrical mirror 504, concave mirror 506, and pre-sample mirrors 510. The detector unit 208 includes the image capture optic 401 which is positioned far enough from the web 102, and has a large enough field of view, to capture all the sample light 303 simultaneously. The sample light is focused and sent to the entrance slit of the hyperspectral imaging systems and is positioned to image the second side 114 of web 102.

Figure 6:
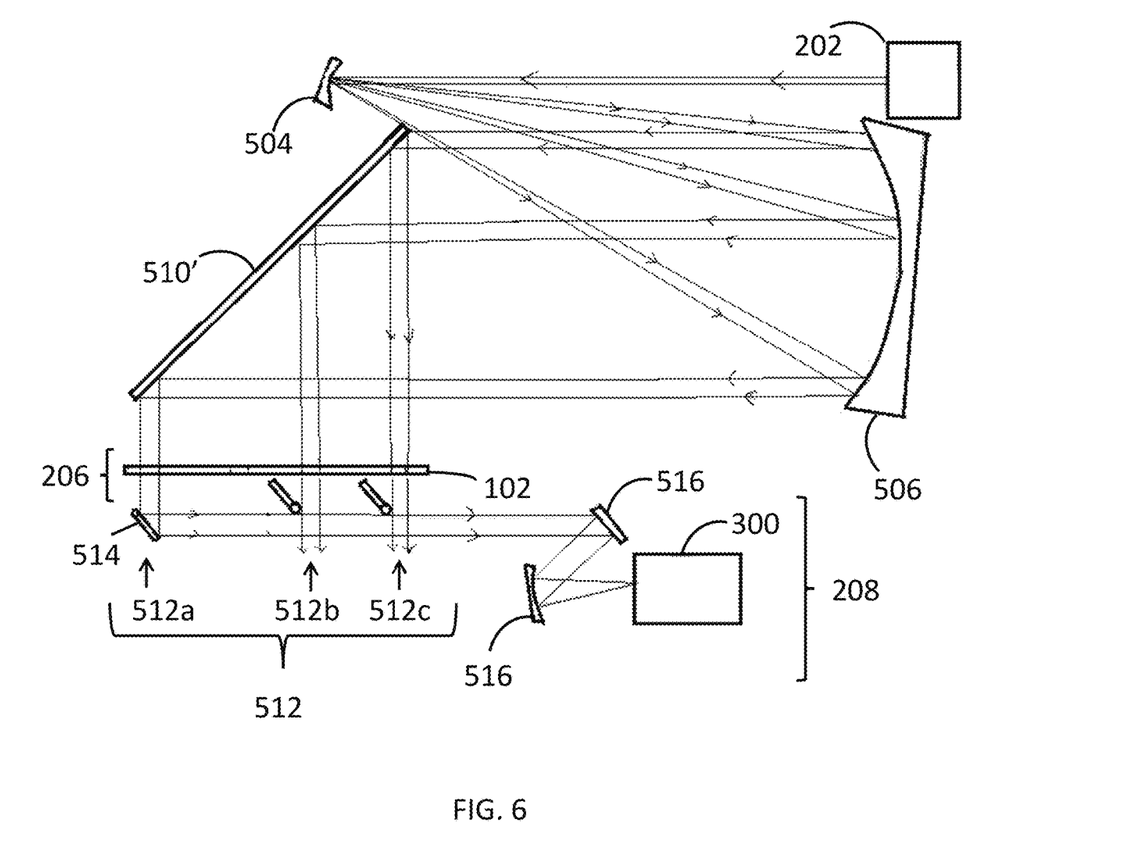
FIG. 6 shows a second implementation of the web gauging system of FIG. 2.

FIG. 6 illustrates another implementation of the web gauging system 200. In this implementation, the pre-sample mirror 510' is not multiplexed. That is, only one pre-sample mirror 510' is used to direct light from the concave mirror 506. In this implementation, the channels 512 (e.g., 512a, 512b and 512c) are created by the flipper mirrors 514, as each sequentially directs light to the re-focusing optics 516. Other features, such as the SC Laser 202, the cylindrical mirror 504, the sample illumination area 206, the web 102, the detector unit 208, the re-focusing optics 516, and the spectrophotometer 300 are as previously described.

Figure 7:
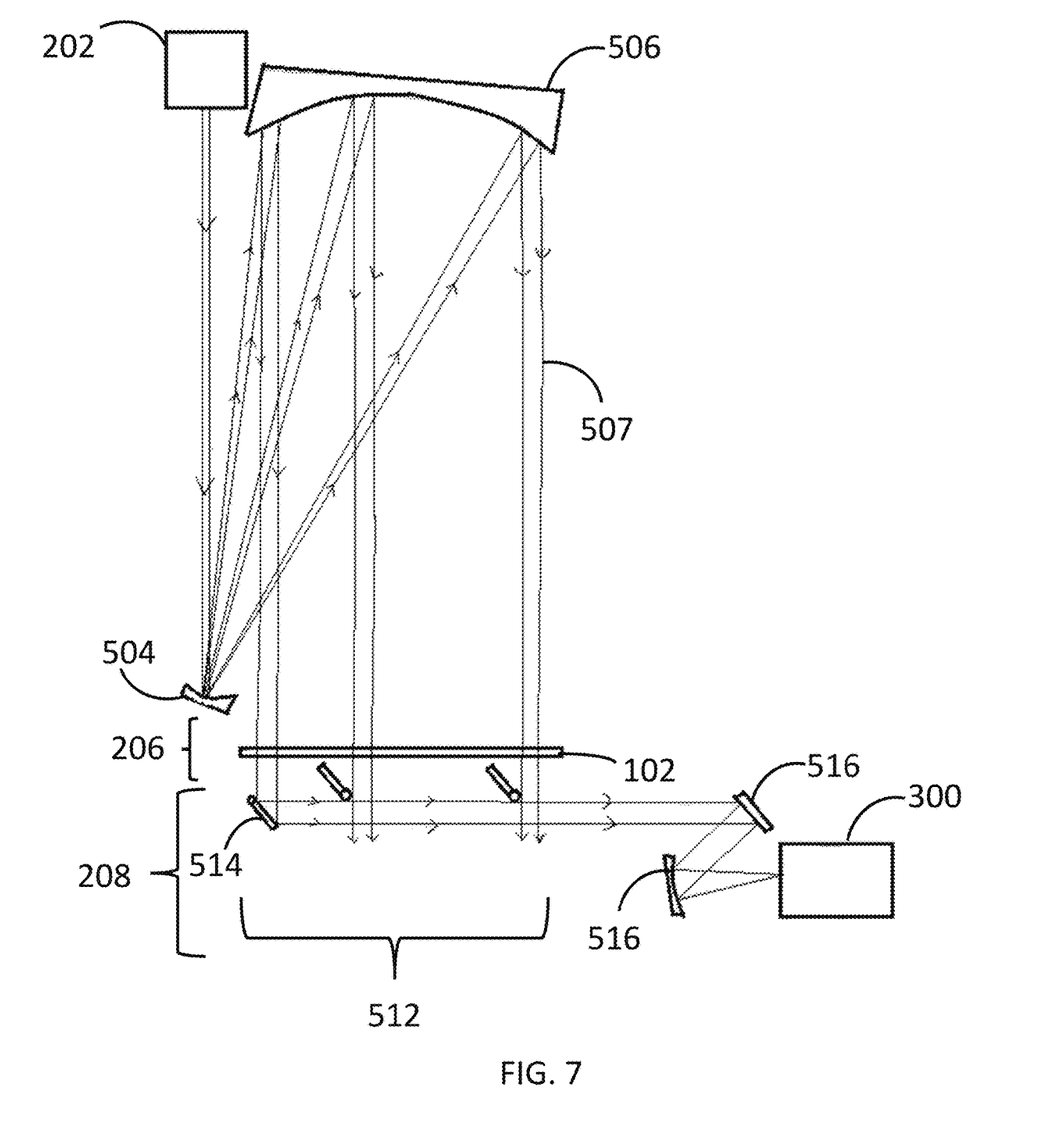
FIG. 7 shows a third implementation of the web gauging system of FIG. 2.

In yet another implementation as shown in FIG. 7, no pre sample mirror 510 or 510' is used. The expanded light 507 from the concave mirror 506 is sent directly to the sample illumination area 206. Other elements such as the SC Laser 202, the cylindrical mirror 504, the web 102, the flipper mirrors 514, the channels 512, the detector unit 208, the refocusing optics 516, and the spectrophotometer 300 are as previously described.

Figure 8:
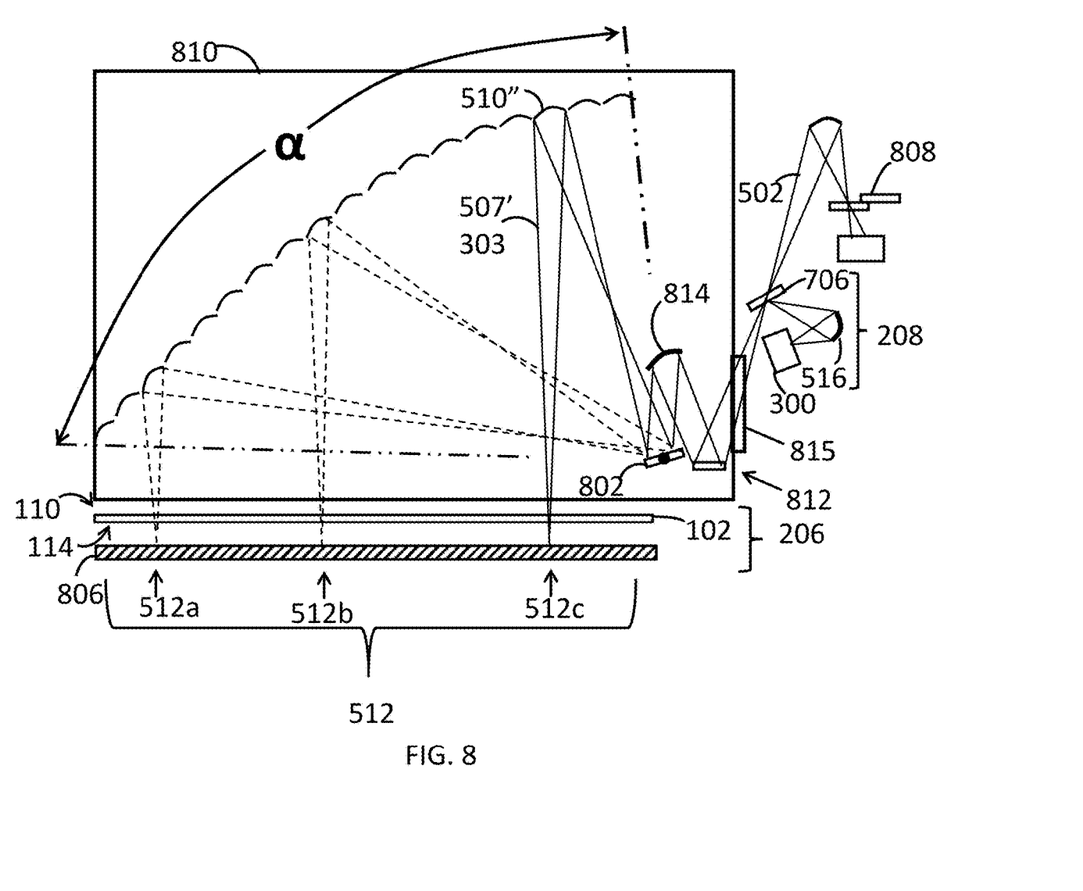
FIG. 8 shows a fourth implementation of the web gauging system of FIG. 2.

FIG. 8 shows an implementation of the web gauging system 200 with an alternative beam expander 204 (FIG. 2) configuration. The beam expander 204 includes a rotating mirror 802 that reflects the collimated SC Laser beam 502 sequentially over a sweeping angle α (between the dash-dot-dot lines) towards pre-sample mirrors 510'', which redirect the light towards the sample illumination area 206. In some implementations, a is between about 10° and 170°. In some implementations, the pre-sample mirrors 510'' are concave.

In FIG. 8, solid lines indicate light ray paths at one instance in time where the rotating mirror 802 is in the one rotational position of angle α. Dashed lines indicate other light paths that can occur when the rotating mirror 802 rotates to other possible rotational positions of angle α. The solid and dashed lines also show how expanded beam 507' is directed towards the sample illumination area 206 as discrete channels 512, and through the web 102. In the figure, an instant in time is shown when the rotating mirror 802 has activated the channel 512c, where the channels 512a and 512b are not activated.

A reflective surface or mirror 806 is positioned facing the second side 114 of the web 102. The expanded light 507' passes through the first side 110 of the web 102, is reflected by the reflective surface 806, and the expanded light 507' then passes again through the web 102 from the second side 114. Light emerges from the first side 110 of the web 102 in the opposite direction of expanded light 507' as sample light 303. Sample light 303 follows the same path as the expanded beam 507, except in the reverse direction.

The detector unit 208 shown in FIG. 8 includes a beam splitter 706. The beam splitter 706 diverts the sample light 303 to the re-focusing optic 516 and the spectrophotometer 300. In some implementations, linear variable filters 808 or a filter array are used. In such implementations, a single element detector is used instead of the spectrophotometer 300. It is understood that the linear variable filters 808 can optionally be implemented in any of the previously described implementations.

In some implementations, a purge box 810 is used. The purge box 810 can create a controlled environment for the light paths, such as expanded beam 507' and sample light 303, to avoid unwanted absorption from gases such as water vapor or scattering from liquid droplets/aerosols or particulates such as dust. The purge box 810 can be purged with any useful gas such as dry air, nitrogen, argon, or helium. In some implementations, a pressure higher than atmospheric pressure is maintained within the purge box 810. In some other implementations, a pressure lower than atmospheric pressure is maintained within the purge box. A window 815 that is transparent to the light of interest (e.g., IR light with 1 μm≤λ≤5 μm) allows the collimated SC Laser beam 502 into the purge box 810. Transparent window(s) are also positioned facing the first side of web 110 to allow expanded beam 507' out of the purge box 810, and to allow sample light 303 into the purge box 810. Other configurations of the purge box 810 can be used as would be understood by a person of skill to minimize unwanted absorption of light. The purge box 810 is also optionally implemented in all of the web gauging systems 200 described herein.

Re-directing mirror 812 and focusing mirror 814 are also show. These can be implemented as needed to provide or direct the collimated SC Laser beam 502 to the rotating mirror 802. In some implementation, addition focusing, re-directing or collimating mirrors can be used.

In some implementations, the reflective surface 806 contacts the web 102, or is part of the web. For example, in some implementations the web 102 slides on the reflective surface, or the reflective surface moves/conveys the web 102, such as with a moving conveyor belt including the reflective surface 806 facing the second side 114 of the web 102. As another example, the web 102 can include the reflective surface 806 as a layer e.g., on the bottom, such as an aluminum foil or a copper.

FIGS. 5-8 show implementations of the web gauging system 200 for transmission of light through the web 102. That is, light from the expanded beam 507 or 507' passes through the sample illumination area 206 providing the sample light 303. A person of skill in the art would understand how to make modifications to convert these to detection reflected or scattered light from the web 102. In the implementation shown by FIG. 8, this can be accomplished by removing/not including the reflective surface 806, where the sample light 303 would be created by scattering and reflecting off web the 102.

The web gauging system 200 (FIG. 2) also includes a central control system CCS to control and synchronize the various elements such as the flipper mirrors 514 (FIGS. 5A, 6 and 7), the rotating mirror 802 (FIG. 8), the SC Laser 202, the spectrophotometer 300 (FIG. 3), and the hyperspectral imaging system 400 (FIG. 4). The CCS includes at least a CPU, memory (volatile and non-volatile), and a power source. Sensors (e.g., cameras, temperature, tension, electrical resistance), alarms and microcontrollers can also be connected to the CCS, for example to monitor the state of the various components of the web gauging system 200 (e.g., overheating, out of specification) or of the web 102 (e.g., detection of the presence of the web in the illumination area 206), and provide a record to the memory or an alarm to alert operators of a specific condition. The detector unit 208 includes or is connected to a digital signal processor (DSP) which can be controlled by the CCS. The DSP can include a memory and CPU configured to store and execute algorithms for analysis of the signals detected by the detector unit 208. The CCS can be partially or entirely provided remotely at a central server or in the cloud. For example, the CCS is connected by WiFI, Zigbee, or Bluetooth to the sensors, microcontrollers, or DSP. The CCS can also be connected to one or more user interfaces such as a monitor, and input devices such as a keyboard.

Figure 9:
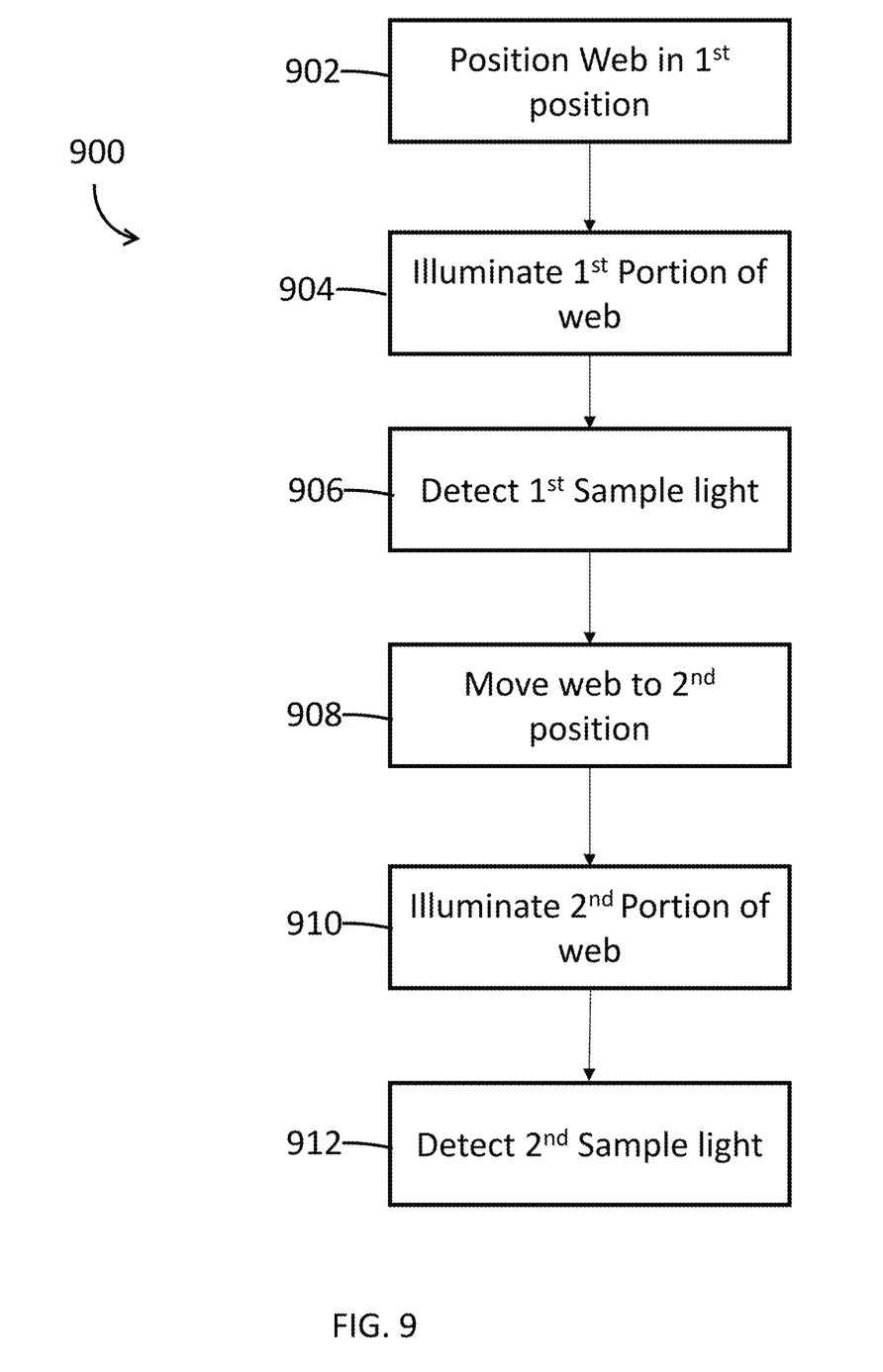
FIG. 9 is a flow diagram showing steps for measuring a web parameter, according to some implementations.

FIG. 9 is a flow diagram showing a method 900 for measuring a web parameter. The method can be implemented using the web gauging system 200 (FIGS. 5-8). In step 902, the web 102 is positioned in the sample illumination area 206. In step 904, a first portion of the web is illuminated by the expanded light beam 507, 507' and a first sample light 303 is produced. The first sample light 303 is detected by the detector unit 208 in step 906. For a continuous web system, the steps 908, 910, and 912 are used to measure the moving web. The web 102 is moved to a second position in step 908, for example by translating in the web direction 130. A second portion of the web 102 is illuminated in step 910, and a second sample light is detected in step 912 using the detector unit 208. It is understood that steps 908, 910, and 912 can be repeated any number of times, to detect a $3^{rd}$, $4^{th}$, $5^{th}$, etc. sample light 303, until an entire web in the web direction 108 is measured. It is also understood that the movement of the web can be continuous and at a substantially constant speed, where each portion that is measured sequentially corresponds to an area traversed in the web direction 130 through illumination area 206. That is, the first portion can be measured between time point $t_0$ and $t_1$ which measures the amount of web 102 that traverses through illumination area 206 during the time ($\Delta_{t1-t0}$); the second portion can be measured between a subsequent time between $t_1$ and $t_2$ which measures the amount of web 102 that traverses through illumination area 206 during that time ($\Delta_{t2-t1}$); and the third portion can be measured between a subsequent time between $t_2$ and $t_3$ which measures the amount of web 102 that traverses through illumination area 206 during that time ($\Delta_{t3-t2}$). Optionally, there are gaps between each of the measurements, for example, where measurement of web 102 only occurs at the first portion during $\Delta_{t1-t0}$, no measurement occurs at the second portion during $\Delta_{t2-t1}$, and measurement occurs at the third portion during $\Delta_{t3-t2}$.

The first and second sample lights 303 are indicative of a web parameter. The web parameter is any web parameter that can be determined by the frequencies of light provided by the SC Laser 202 and the detector unit 208. In some implementations, the web parameter is one or more of a thickness, a composition, and a temperature. For example, the sample light can include —OH stretching and is indicative of a composition having hydroxyl groups, where a change in the —OH stretching band between the first and second positions, indicates a change in —OH containing compounds (e.g., water). In other implementations, transmission of infrared light over a range of frequencies is monitored and changes in the sample light between position 1 and position 2 indicate changes in the amount of material or thickness of the web. In some implementations the parameter relates to an occlusion or foreign material/contaminant. In some implementations the parameter relates to missing material, such as a hole or tear. In some implementations, the parameter relates to a topography such as a roughness.

The method can be used to examine any thin sheet like material or web that is moving or stationary. By way of example, this includes thin resin sheets (e.g., polyethylene), cellulose (e.g., paper), coated sheets, textiles, and laminates. In some implementations, the web includes a coating of one or more material uniformly or non-uniformly (e.g., patterned) distributed over a thin substrate.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. For example, the hyperspectral imaging system 400 described with reference to FIG. 4 can be implemented in the embodiments shown in FIGS. 5A, 6, 7 and 8. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A web gauging system comprising:
   a supercontinuum Laser providing a light beam;
   a beam expander configured to expand and collimate the light beam and provide an expanded beam having approximately the width of a web to an illumination area; and
   a detector unit comprising a plurality of flipper mirrors each associated with a channel of the expanded beam, the flipper mirrors configured to sequentially pass a sample light from the channels to a detector.

2. The web gauging system according to claim 1, wherein the detector includes a spectrophotometer.

3. The web gauging system according to claim 1, wherein the detector includes a hyperspectral imaging system.

4. The web gauging system according to claim 1, wherein the light beam includes infrared light.

5. The web gauging system according to claim 4, wherein the light beam has wavelengths in the range of about 1 μm to 5 μm.

6. The web gauging system according to claim 1, wherein the beam expander includes a cylindrical mirror.

7. The web gauging system according to claim 1, wherein the beam expander comprises a rotating mirror configured to reflect the light beam sequentially over a sweeping angle (a) to provide the expanded beam.

8. The web gauging system according to claim 1, wherein the beam expander includes a concave mirror configured to collimate the expanded beam and direct it to the illumination area.

9. The web gauging system according to claim 1 further comprising a plurality of pre-sample mirrors each associated with one of the channels and configured to direct the expanded beam at the illumination area.

10. The web gauging system according to claim 1, wherein the detector unit includes one or more re-focusing optics to focus the sample light.

11. The web gauging system according to claim 1, wherein light from the expanded beam passes through the illumination area providing the sample light.

12. The web gauging system according to claim 1, wherein a reflected or scattered light from the illumination area provides the sample light.

13. The web gauging system according to claim 1, wherein the illumination area has a substantially rectangle boundary having a long dimension approximately parallel to a cross-web direction, and a short dimension approximately parallel to a web direction.

14. The web gauging system according to claim 1, wherein the illumination area illuminates at least about 10% of a moving web as the web moves through the illumination area.

15. The web gauging system according to claim 14, wherein more that 1% of the moving web provides the sample light that is analyzed by the detector unit.

16. A method of measuring a web parameter, the method comprising:
 positioning the web in the sample illumination area of the web gauging system according to claim 1;
 illuminating a first portion of the web with the light beam and producing a first sample light;
 detecting the first sample light with the detector unit, wherein the first sample light is indicative of a web parameter of the first portion of the web.

17. The method according to claim 16 further comprising moving the web to illuminate a second portion of the web and detecting a second sample light with the detector unit, wherein the second sample light is indicative of the web parameter of the second portion of the web.

* * * * *